United States Patent [19]

Hamazaki

[11] Patent Number: 5,272,873
[45] Date of Patent: Dec. 28, 1993

[54] EVAPORATIVE EMISSION CONTROL SYSTEM FOR INTERNAL COMBUSTION ENGINES

[75] Inventor: Yukio Hamazaki, Wako, Japan

[73] Assignee: Honda Giken Kogyo Kabushiki Kaisha, Tokyo, Japan

[21] Appl. No.: 964,683

[22] Filed: Oct. 22, 1992

[30] Foreign Application Priority Data

Oct. 24, 1991 [JP] Japan .................. 3-303847

[51] Int. Cl.⁵ .................. F01N 3/36; F02M 33/02
[52] U.S. Cl. .................. 60/283; 60/290; 123/520
[58] Field of Search .................. 60/283, 290, 293; 123/518, 519, 520

[56] References Cited

U.S. PATENT DOCUMENTS

| | | | |
|---|---|---|---|
| 3,618,314 | 11/1971 | Krebs | 60/297 |
| 4,467,769 | 8/1984 | Matsumura | 123/520 |
| 5,158,059 | 10/1992 | Kuroda | 123/520 |

FOREIGN PATENT DOCUMENTS

| | | | |
|---|---|---|---|
| 20658 | 6/1972 | Japan | 60/283 |
| 58-143 | 4/1984 | Japan | 60/283 |
| 60-27819 | 8/1985 | Japan . | |

Primary Examiner—Douglas Hart
Attorney, Agent, or Firm—Nikaido, Marmelstein, Murray & Oram

[57] ABSTRACT

An evaporative emission control system controls emission of evaporative fuel from an internal combustion engine having an intake system, an exhaust system, a catalytic converter arranged across the exhaust system, and a fuel tank. A charcoal canister is connected to the fuel tank for collecting evaporative fuel generated from the fuel tank. An exhaust purging passage is disposed to connect between the charcoal canister and the exhaust system for introducing evaporative fuel from the canister together with purging air into the exhaust system at a location upstream of the catalytic converter. Load on the engine is detected. The exhaust purging passage is opened when the load on the engine detected is below a predetermined value.

10 Claims, 2 Drawing Sheets

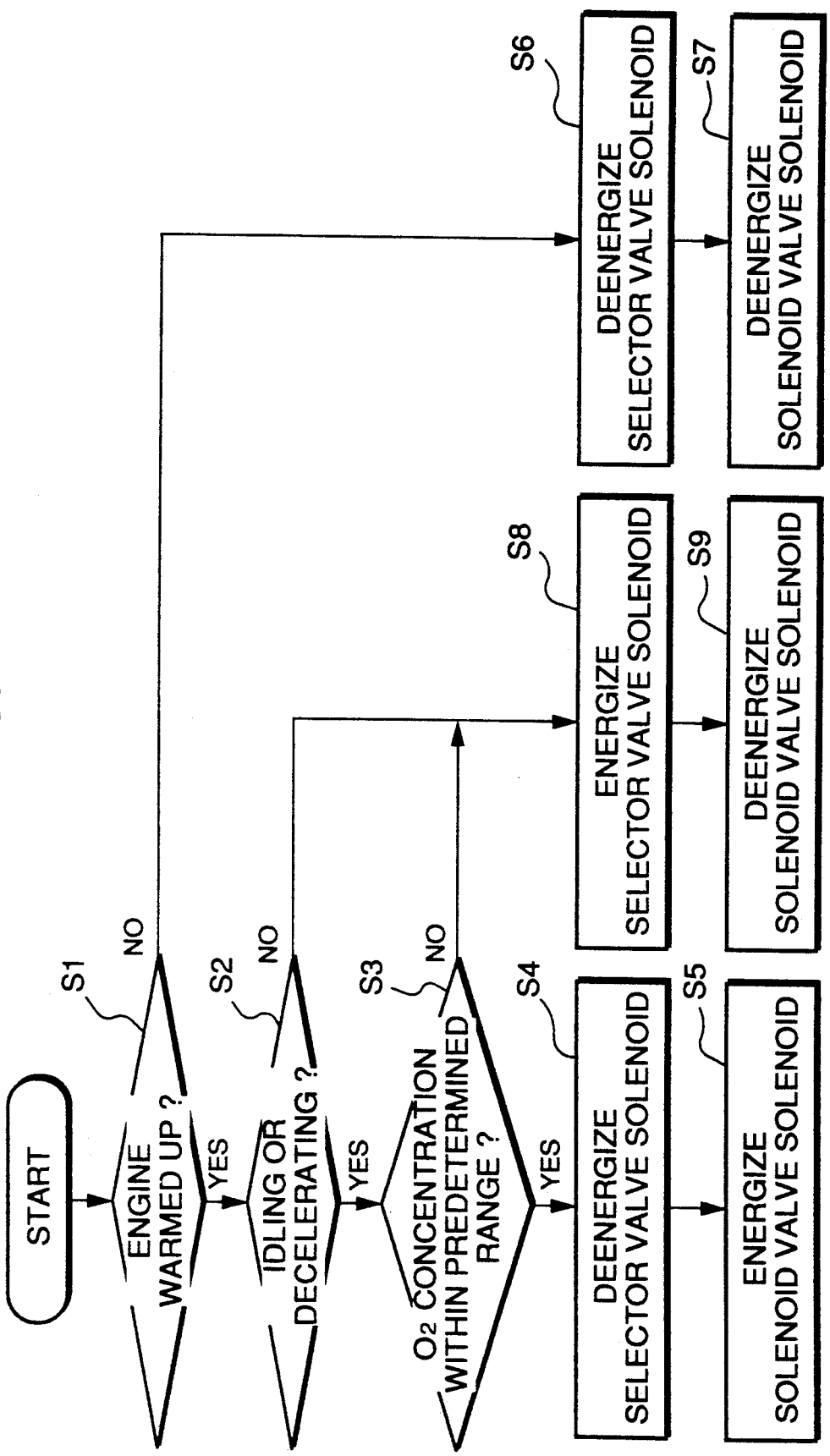

EVAPORATIVE EMISSION CONTROL SYSTEM FOR INTERNAL COMBUSTION ENGINES

BACKGROUND OF THE INVENTION

1. Field of the Invention

This invention relates to an evaporative emission control system for an internal combustion engine for automotive vehicles, for controlling emission of evaporative fuel generated in a fuel tank of the engine, and more particularly to an evaporative emission control system which is adapted to collect and store evaporative fuel generated from the fuel tank in a charcoal canister, and controls emission of the stored evaporative fuel by purging it with purging air to the engine.

2. Prior Art

In automotive vehicles, evaporative fuel is generated in a fuel tank thereof, particularly when they are standing at a high temperature. The evaporative fuel, which is composed of hydrocarbons, will cause air pollution if it is freely emitted into the air. Therefore, it is necessary to prevent it from being emitted into the atmosphere. For this purpose, a charcoal canister is generally connected to the fuel tank for collecting and storing therein evaporative fuel generated in the fuel tank. The charcoal canister is in the form of a container containing an adsorbent, such as activated carbon, for adsorbing evaporative fuel, with a port opening into the atmosphere. Usually, the charcoal canister is connected to the intake system of the engine via a purging passage.

When the engine is in operation, outside air is drawn into the charcoal canister via the port of the charcoal canister, due to negative pressure generated in the intake system of the engine. Accordingly, the evaporative fuel adsorbed by the adsorbent in the charcoal canister is carried off the adsorbent by the outside air drawn in, and purged via the purging passage into the intake system. The evaporative fuel and the outside air, i.e. purging air are drawn together in the form of a mixture via the intake system into the combustion chambers of the engine, where the mixture is burned.

By thus purging the evaporative fuel adsorbed by the adsorbent in the charcoal canister when the engine is in operation, the fuel-adsorbing efficiency of the charcoal canister is restored for use when the engine is in stoppage.

The purging air thus introduced via the charcoal canister into the intake system at the start of the engine contains fuel having a relatively high concentration. Therefore, if a large amount of purging air is allowed to be introduced into the intake system when the engine is not warmed up at the start thereof or when the engine in a low engine rotational speed-low load condition in which the total amount of intake air is small, the engine may become unstable.

Therefore, in general, the amount of purging air and evaporative fuel purged is controlled depending on operating conditions of the engine.

For example, a purging port is provided at a terminal end of the purging passage which opens into the intake system and via which purging air is introduced into the intake system as disclosed, for example, by Japanese Provisional Patent Publication (Kokai) No. 59-58143. The purging port is located at such a so-called Pc port location that the purging port is positioned upstream of the throttle valve when the latter is fully closed and positioned downstream of same when it is opened to a medium or larger degree. The provision of the purging port at the Pc port location thus causes the purging port to be positioned upstream of the throttle valve when the engine is in a low load condition, so that the pressure of intake air in the vicinity of the purging port is maintained at atmospheric pressure. Accordingly, the outside air is not drawn into the charcoal canister, inhibiting the purging of evaporative fuel. On the other hand, when the engine is in a high load condition in which the throttle valve is fully opened, the pressure of intake air in the vicinity of the purging port is approximately equal to atmospheric pressure, which prevents the purging of evaporative fuel. When the throttle valve is half opened, assuming a medium opening degree, negative pressure created in the intake pipe is applied to the purging passage via the purging port, which causes the outside air to be drawn into the purging passage via the charcoal canister, effecting purging of evaporative fuel.

In short, the purging port provided in the Pc port location has the function of controlling the amount of evaporative fuel purged, in dependence on load on the engine.

Further, an evaporative emission control system has been proposed by Japanese Utility Model Publication (Kokoku) No. 60-27819, in which the purging of evaporative fuel is not carried out when the engine is not warmed up, whereas the purging air is introduced into the intake system of the engine when the engine is in a predetermined temperature range, and when the temperature of the engine is higher than the upper limit of the predetermined range, the purging air is introduced into the exhaust system of the engine. According to this evaporative emission control system, an intake purging passage and an exhaust purging passage are provided for connecting between a charcoal canister, and the intake system and the exhaust system of the engine, respectively, and one of the purging passages is selected for use by means of a selector valve which operates in response to the temperature of engine coolant.

According to the proposed evaporative emission control system, the purging air is processed in the exhaust system when the engine is at a high temperature in a normal operating condition, which prevents the air-fuel ratio of a mixture supplied to the engine from being adversely affected.

On the other hand, in recent years, regulations on emission of evaporative fuel as unburned gas into the air have become more strict, and accordingly a charcoal canister for adsorbing or storing the evaporative fuel is generally increased in size, which has increased capacity of absorbing and storing evaporative fuel therein. Therefore, it is required to increase the amount of evaporative fuel purged. However, if the amount of evaporative fuel purged or purging air is controlled by the purging port arranged at the Pc port location as in conventional systems, the purging of evaporative fuel is not effected when the engine is in a low load condition, i.e. when the engine is idling or decelerating. Therefore, the amount of evaporative fuel purged is limited, which makes it impossible to fully utilize the adsorbing capability of the charcoal canister. On the other hand, according to the proposed system adapted to introduce the purging air into the exhaust system when the engine is at a high temperature, the purging air is always processed in the exhaust system after the engine has been warmed up, which results in a waste of evaporative fuel contained in the purging air, greatly increasing the fuel consumption. Moreover, when the pressure of exhaust gases is high, the purging air cannot be introduced into the exhaust system, which imposes a substantial limit on an engine operating condition region in which the purging of evaporative fuel is permitted, and hence makes it difficult to increase the amount of evaporative fuel purged.

SUMMARY OF THE INVENTION

It is the object of the invention to provide an evaporative emission control system for an internal combustion engine, which is capable of effecting purging of evaporative fuel over a wide engine operating condition region, to thereby increase the amount of evaporative fuel purged, preserving the fuel-adsorbing efficiency of the charcoal canister at a high level.

To attain the above object, the present invention provides an evaporative emission control system for an internal combustion engine having an intake system, an exhaust system, a catalytic converter arranged across the exhaust system, and a fuel tank.

The evaporative emission control system according to a first aspect of the invention is characterized by comprising:

a charcoal canister connected to the fuel tank for collecting evaporative fuel generated from the fuel tank;

an exhaust purging passage disposed to connect between the charcoal canister and the exhaust system for introducing evaporative fuel from the canister together with purging air into the exhaust system at a location upstream of the catalytic converter;

load detecting means for detecting load on the engine; and control means responsive to an output from the load detecting means for opening the exhaust purging passage when the load on the engine detected by the load detecting means is below a predetermined value.

Preferably, the load detecting means detects opening of a throttle valve arranged in the intake system.

Alternatively, the load detecting means detects at least one of pressure within the intake system and the rotational speed of the engine.

Preferably, the predetermine value is an upper limit of a range of values of load on the engine to be assumed when the engine is either idling or decelerating.

The evaporative emission control system according to a second aspect of the invention is characterized by comprising:

a charcoal canister connected to the fuel tank for collecting evaporative fuel generated from the fuel tank;

an intake purging passage disposed to connect between the charcoal canister and the intake system for introducing evaporative fuel from the charcoal canister together with purging air to the intake system;

an exhaust purging passage disposed to connect between the charcoal canister and the exhaust system for introducing evaporative fuel from the canister together with purging air into the exhaust system at a location upstream of the catalytic converter;

load detecting means for detecting load on the engine;

selector means for selectively opening and closing the intake purging passage and the exhaust purging passage; and control means responsive to an output from the load detecting means for controlling the selector means in a manner such that when the load on the engine detected by the load detecting means is below a predetermined value, the exhaust purging passage is opened, whereas when the load on the engine detected by the load detecting means is above the predetermined value, the intake purging passage is opened.

Preferably, the exhaust purging passage branches off from a predetermined portion of the intake purging passage, the selector means comprising a valve arranged at the predetermined portion for selectively opening and closing the intake purging passage and the exhaust purging passage.

More preferably, the evaporative emission control system further includes a second valve arranged across the exhaust purging passage for opening and closing the exhaust purging passage, and the control means causes the valve of the selector means and the second valve to open the exhaust purging passage when the load on the engine detected by the load detecting means is below the predetermined value, and causes the valve of the selector means and the second valve to close the exhaust purging passage when the load on the engine is above the predetermine value.

The above and other objects, features, and advantages of the invention will become more apparent from the ensuing detailed description taken in conjunction with the accompanying drawings.

BRIEF DESCRIPTION OF THE DRAWINGS

FIG. 2 is a flowchart showing a program for evaporative fuel purging control executed by an electronic control unit (ECU) appearing in FIG. 1.

DETAILED DESCRIPTION

Figure 1:
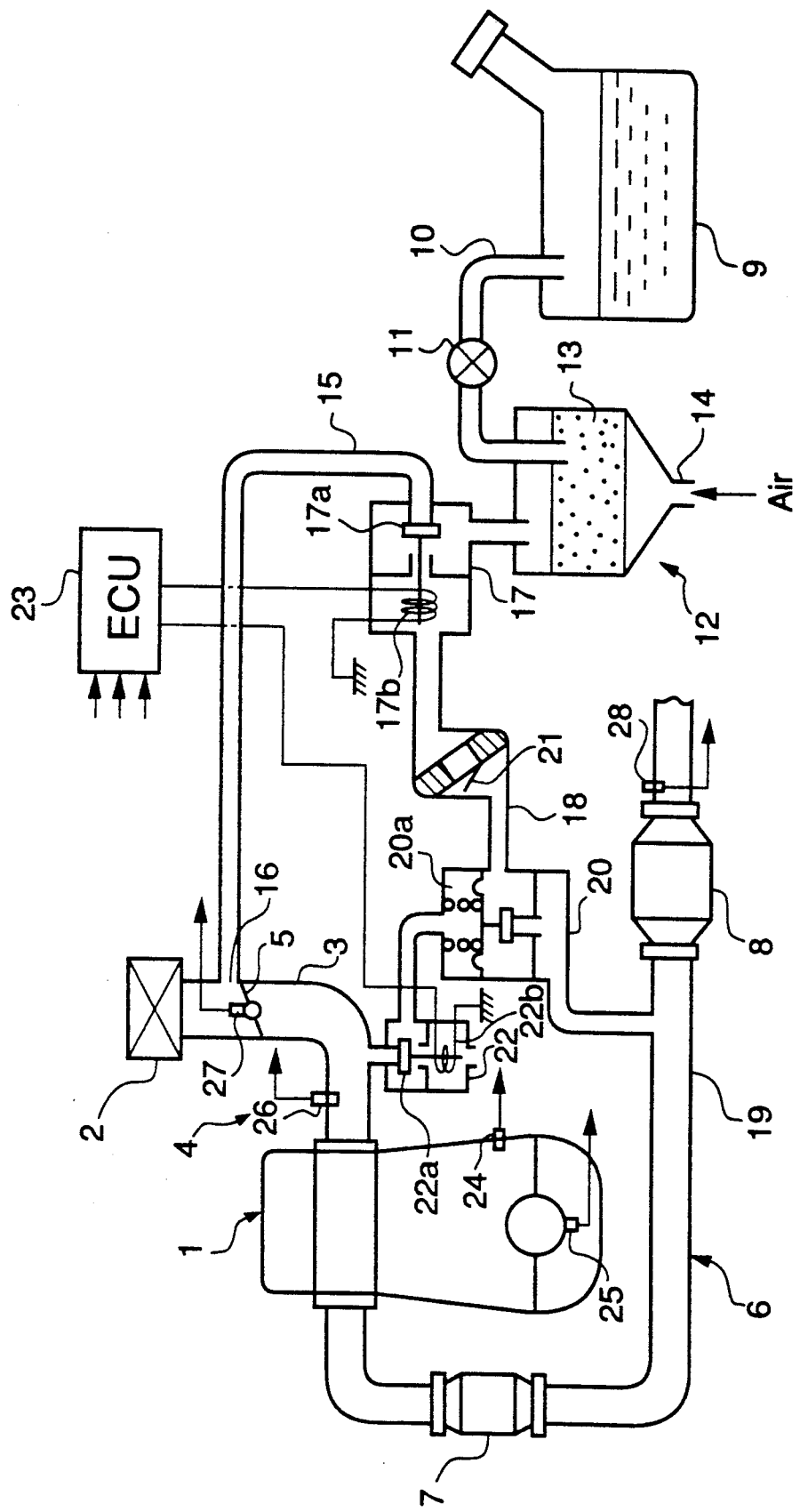
FIG. 1 is a schematic diagram showing the whole arrangement of an evaporative emission control system according to an embodiment of the invention.

The invention will now be described in detail with reference to the drawings showing an embodiment thereof.

Referring first to FIG. 1, there is schematically shown the whole arrangement of an evaporative emission control system according to the embodiment. In the figure, reference numeral 1 designates a cylinder block of an internal combustion engine (hereinafter referred to as "the engine"), to which is connected an intake system 4 having an air cleaner 2 and an intake pipe 3 for supplying intake air to the engine 1. Arranged in the intake system 4 is a throttle valve 5 for controlling the amount of intake air supplied to the engine 1. Further, an exhaust system 6 is connected to the engine 1 through which exhaust gases from the engine 1 are emitted to the outside. An upstream catalytic converter 7 and a downstream catalytic converter 8 are arranged across the exhaust system 6 for purifying the exhaust gases.

Provided in the intake pipe 3 at a location immediately upstream of the engine 1 are fuel injection valves, not shown, which are connected via a fuel supply pipe, not shown, to a fuel tank 9. Connected to the top of the fuel tank 9 is an end of a vapor pipe 10 having a two-way valve 11 arranged across it. The other end of the vapor pipe 10 is connected to a charcoal canister 12. Evaporative fuel generated within the fuel tank 9 flows into the charcoal canister 12 via the vapor pipe 10 when the internal pressure of the tank 9 exceeds a predetermined value to which the two-way valve 11 is set, whereas evaporative fuel stored in the charcoal canister 12 is returned through the two-way valve 11 to the fuel tank 9 when the internal pressure of the tank 9 becomes negative.

The charcoal canister 12 has an adsorbent 13, such as activated carbon, received therein for adsorbing evaporative fuel. The charcoal canister 12 has a port 14 formed through a bottom wall thereof and opening into the atmosphere.

Further, one end of an intake purging passage 15 is connected to the top of the charcoal canister 12. The other end of the intake purging passage 15 is connected to a purging port 16 opening into the intake system 4 of the engine. The purging port 16 is located at such a location (Pc port location) as is positioned upstream of the throttle valve 5 when the latter is fully closed, and positioned downstream of same when the valve 5 is opened to a certain degree.

A selector valve 17 is arranged across the intake purging passage 15. An exhaust purging passage 18 branches off from the intake purging passage 15 with one end thereof connected to the selector valve 17. The selector valve 17 is comprised of a valving element 17a and a solenoid 17b for displacing the valving element 17a. When the solenoid 17b is not energized, the valving element 17a moves into a position closing up an opposed end of the intake purging passage 15 and at the same time establishing communication between the charcoal canister 12 and the exhaust purging passage 18, whereas when the solenoid 17b is energized, the valving element 17a returns into a position establishing communication between the charcoal canister 12 and the intake purging passage 15 and at the same time closing up an opposed end of the exhaust purging passage 18. That is, the selector valve 17 forms selector means for selectively opening the intake purging passage 15 and the exhaust purging passage 18 for purging evaporative fuel.

The other end of the exhaust purging passage 18 is connected to an exhaust pipe 19, forming part of the exhaust system 6, at a location immediately upstream of the downstream catalytic converter 8 arranged in the intake system 6. Arranged across the exhaust purging passage 18 between the other end connected to the exhaust pipe 19 and the selector valve 17 are a shut-off valve 20 and a reed valve 21 in the order mentioned from the exhaust pipe 19 side. The shut-off valve 20 operates in response to negative pressure, and has a negative pressure chamber 20a to which negative pressure created downstream of the throttle valve 5 in the intake pipe 3 is introduced via a solenoid valve 22. The solenoid valve 22 is comprised of a valving element 22a, and a solenoid 22b, and operates such that when the solenoid 22b is not energized, the valving element 22a is biased in a position cutting off communication between the intake pipe 3 and the negative pressure chamber 20a of the shut-off valve 20, whereas when the solenoid 22b is energized, the valving element 22a moves into a position establishing the communication. When the communication between the intake pipe 3 and the negative pressure chamber 20a of the shut-off valve 20 is cut off, outside air is allowed to be introduced into the negative pressure chamber 20a. Thus, the shut-off valve 20 opens when negative pressure is introduced into the negative pressure chamber 20a, and shuts off when atmospheric pressure is introduced thereinto.

The reed valve 21 serves as a check valve, which is adapted to shut off the exhaust purging passage 18 when the pressure of exhaust gases within the exhaust pipe 19 becomes high.

The shut-off valve 20 and the reed valve 21 are provided for the purpose of preventing reverse flow of exhaust gases from the exhaust pipe 19 to the charcoal canister 12.

The solenoid 17b of the selector valve 17 and the solenoid 22b of the solenoid valve 22 are controlled by control signals supplied from an electronic control unit (hereinafter referred to as "the ECU") 23. The ECU 23 is supplied with electric signals from an engine coolant temperature sensor 24 and an engine rotational speed sensor 25, both arranged in the cylinder block of the engine 1, an intake pipe negative pressure sensor 26 for detecting negative pressure within the intake pipe 3 at a location downstream of the throttle valve 5, a throttle valve opening sensor 27 connected to the throttle valve 5, a post-catalyst O₂ sensor 28 arranged in the exhaust pipe 19 downstream of the downstream catalytic converter 8, etc.

The ECU 23 spplies the control signals according to a program shown in FIG. 2.

Upon starting of the evaporative fuel purging control, first at a step S1, it is determined from the engine coolant temperature detected by the engine coolant temerature sensor 24 whether or not the engine has been sufficiently warmed up. If the answer to this question is affirmative (YES), i.e. the engine has been sufficiently warmed up, it is determined at a step S2 whether or not the engine is idling or decelerating. This determination is effected based on the opening of the throttle valve 5 detected by the throttle valve opening sensor 27. However, this is not limitative, but it may be effected based on both or either of the engine rotational speed and negative pressure prevailing within the intake pipe 3. Therefore, one of or a combination of the throttle valve opening sensor 27, the engine rotational speed sensor 25, and the intake pipe negative pressure sensor 26 forms load detecting means for detecting the above-mentioned operating parameters. If it is determined that the engine is idling or decelerating, the program proceeds to a step S3, where it is further determined whether or not the concentration of oxygen contained in exhaust gases detected by the O₂ sensor 28 is within a predetermined range. If it is determined that the oxygen concentration is sufficiently high, or falls within the predetermined range, the program proceeds to a step S4, where the ECU 23 outputs a signal for deenergizing the solenoid 17b of the selector valve 17 at a step S4 and at the same time outputs a signal for energizing the solenoid 22b of the solenoid valve 22 for opening the shut-off valve 20 at a step S5.

On the other hand, if the engine has not been fully warmed up, the ECU outputs the signal for deenergizing the solenoid 17b of the selector valve 17 at a step S6 and at the same time a signal for deenergizing the solenoid 22b of the solenoid valve 22 at a step S7. Further, when the engine has been warmed up, but the engine is neither idling nor decelerating, or the oxygen concentration in exhaust gases detected by the O₂ sensor 28 is not sufficiently high, i.e. falls outside the above-mentioned predetermined range, the ECU 23 outputs the signal for energizing the solenoid 17b of the selector valve 17 at a step S8 and at the same time outputs the signal for deenergizing the solenoid 22b of the solenoid valve 22 at a step S9.

The operation of the evaporative emission control system constructed as above will now be described.

When the engine is in stoppage, evaporative fuel generated within the fuel tank 9 is guided via the vapor pipe 10 into the charcoal canister 12, where it is adsorbed by the adsorbent 13 held therein. During stoppage of the engine, the solenoid 17a of the selector valve 17 is deenergized, so that the intake purging passage 15 is shut off by the valving element 17a of same. Accordingly, evaporative fuel is prevented from flowing into the intake system 4 and hence from being emitted into the air via the intake system 4. Further, during stoppage of the engine, the solenoid 22b of the solenoid valve 22 is also deenergized, so that atmospheric pressure is introduced into the negative pressure chamber 20a of the shut-off valve 20. Accordingly, the exhaust purging passage 18 is shut off by the shut-off valve 20, preventing evaporative fuel from flowing out via the exhaust system 6.

When the ignition switch, not shown, of the engine is closed, the engine is started, and power is supplied to the ECU 23, which is then supplied with the above-mentioned signals from the sensors. However, in this state, the engine 1 per se has not been sufficiently warmed-up and hence the engine coolant temperature detected by the engine coolant temperature sensor 24 is low, so that the ECU 23 supplies no signals for energizing the solenoids 17b, 22b. Therefore, the intake purging passage 15 and the exhaust purging passage 18 are both held in the shut-off state, that is, no purging of evaporative fuel is effected.

Thus, when the engine has not been sufficiently warmed up, and hence it is in an unstable operating condition, evaporative fuel is prevented from flowing into the intake system 4 to thereby prevent the engine from becoming heavily unstable or inoperative. At the same time, purging air is prevented from flowing into the exhaust system 6 when the catatlytic converter 8 is at a low temperature and hence has not been activated to a sufficient degree.

When the throttle valve 5 is opened after the engine has been warmed up, a signal indicative of the opening of the throttle valve 5 is supplied from the throttle valve opening sensor 27 to the ECU 23. The ECU 23 determines from this signal that the engine is neither idling nor decelerating, to generate the signal for energizing the solenoid 17b of the selector valve 17. As result, the valving element 17a of the selector valve 17 recedes to effect communication between the intake purging passage 15 and the charcoal canister 12. On this occasion, the purging port 16 is positioned downstream of the throttle valve 5, and accordingly the intake pipe negative pressure is introduced into the intake purging passage 15 via the purging port 16, whereby outside air is drawn into the charcoal canister 12 via the port 14. Accordingly, evaporative fuel adsorbed by the adsorbent 13 within the charcoal canister 12 is purged by purging air. Thus, purging air containing evaporative fuel flows through the intake purging passage 15, and into the intake system 4 via the purging port 16, to be supplied to the combustion chambers of engine 1, where it is burned.

Then, as the opening of the throttle valve 5 increases, the negative pressure in the vicinity of the purging port 16 decreases, and when the throttle valve 5 is fully opened, the pressure in the vicinity of the purging port 16 becomes close to atmospheric pressure, so that purging of evaporative fuel is stopped.

Thus, when the throttle valve 5 is open, i.e. when load is applied on the engine, the amount of purging air drawn in, and hence the amount of evaporative fuel purged is controlled in dependence on the load on the engine.

On the other hand, the selector valve 17 shuts off the exhaust purging passage 18 while the engine is in the above condition. Further, on this occasion, the solenoid 22b of the solenoid valve 22 is not energized, and the shut-off valve 20 also shuts off the exhaust purging passage 18. Therefore, purging air containing evaporative fuel is prevented from being exhausted via the exhaust system 6, to suppress an increase in the fuel consumption. Moreover, reverse flow of exhaust gases from the exhaust system is also prevented.

When the throttle valve 5 is fully closed, so that no load is applied on the engine, i.e. when the engine is idling or decelerating, the purging port 16 is positioned upstream of the throttle valve 5, and accordingly the pressure in the vicinity thereof is equal to atmospheric pressure. Then, no negative pressure is introduced into the intake purging passage 15, so that no purging of evaporative fuel is effected by way of the intake purging passage 15.

If the oxygen concentration of exhaust gases detected by the post-catalyst $O_2$ sensor 28 is low on this occasion, the solenoid 22b of the solenoid valve 22 is held in the deenergized state. That is, the shut-off valve 20 shuts off the exhaust purging passage 18, which prevents purging air from flowing into the exhaust system 6. Accordingly, no purging of evaporative fuel is carried out on this occasion.

However, if the oxygen concentration is higher than a predetermined value defining the lower limit of the aforementioned predetermined range, the ECU 23 outputs the signal for deenergizing the solenoid 17b of the selector valve 17 and the signal for energizing the solenoid 22b of the solenoid valve 22. Accordingly, the valving element 17a of the selector valve 17 shuts off the intake purging passage 15, and at the same time establishes communication between the charcoal canister 12 and the exhaust purging passage 18. Further, the intake pipe negative pressure is introduced into the negative pressure chamber 20a of the shut-off valve 20 to open same. Thus, the exhaust purging passage 18 connecting between the charcoal canister 12 and the exhaust system 18 becomes operative to effect purging into the exhaust system 6.

Under such a low load condition of the engine, negative pressure is usually created within the exhaust system 6. The negative pressure is introduced into the exhaust purging passage 18 and hence outside air is drawn into the charcoal canister 12 via the port 14. The outside air drawn into the charcoal canister 12, i.e. purging air flows together with evaporative fuel carried off the adsorbent 13, through the exhaust purging passage 18 and then into the exhaust system 6. The evaporative fuel is then oxidized or burned, at the downstream catalytic converter 8, followed by being exhausted to the outside. When the concentration of oxygen present in exhaust gases at the downstream catalytic converter 8 is sufficiently high, it is possible to treat or burn the evaporative fuel contained in purging air by the catalytic converter 8.

If during the purging into the exhaust system 6, the pressure within the exhaust system 6 becomes high, the reed valve 21 is closed. Accordingly, reverse flow of exhaust gases into the charcoal canister 12 is positively prevented.

In this manner, according to the evaporative emission control system of the invention, evaporative fuel stored in the charcoal canister 12 is not only purged when the throttle valve 5 is substantially open, i.e. during medium-to-high load conditions of the engine but also when the throttle valve 5 is closed, i.e. during a low load condition of same. Therefore, the total amount of purging air drawn into the charcoal canister 12 during operation of the engine is increased, which enables to positively purge a large amount of evaporative fuel stored e.g. in a largely-sized charcoal canister. Consequently, the adsorbing efficiency of the charcoal canister 12 is maintained at a high level, which results in an increased amount of evaporative fuel stored therein while the engine is in stoppage.

Further, although in the above described embodiment, the purging port 16 provided at one end of the intake purging passage 15 opening into the intake system is located at the Pc port location in the vicinity of the throttle valve 5, this is not limitative, but it may be located downstream of the throttle valve 5. In such a case, to prevent purging air from flowing into the intake system 4 during the low load operating condition of the engine, the solenoid 17b of the selector valve 17 may be held deenergized also when the concentration of oxygen present in exhaust gases detected by the O₂ sensor 28 falls outside the predetermined range.

Further, the present system may be constructed such that when the concentration of oxygen present in exhaust gases detected by the O₂ sensor 28 is low, auxiliarly air is introduced into the exhaust system 6.

Further, to reduce noise generated by the reed valve 21, the charcoal canister 12 may be provided with a silencer.

Although in the above described embodiment, the exhaust purging passage is connected to the exhaust system at a location upstream of the downstream catalytic converter 8, this is not limitative, it may be connected to the exhaust system at a location upstream of the upstream catalytic converter 7. Such arrangement of the exhaust purging passage 18 enables unburned gases contained in the purging air to be oxidized or processed by both of the upstream and downstream catalytic converters 7, 8, thereby achieving more positive evaporative emission control.

What is claimed is:

1. An evaporative emission control system for an internal combustion engine having an intake system, a throttle valve arranged in said intake system, an exhaust system, a catalytic converter arranged across said exhaust system, and a fuel tank, said evaporative emission control system comprising:
    a charcoal canister connected to said fuel tank for collecting evaporative fuel generated from said fuel tank;
    an intake purging passage disposed to connect between said charcoal canister and said intake system for introducing evaporative fuel from said canister together with purging air into said intake system, said intake purging passage having an end thereof opening into said intake passage and located relative to said throttle valve such that when said throttle valve is fully closed, said end of said intake purging passage is positioned upstream of said throttle valve, and when said throttle valve is opened to a certain degree, said end of said intake purging passage is positioned downstream of said throttle valve;
    first control means responsive to pressure developed in said intake system at a location immediately upstream of said throttle valve for controlling an amount of evaporative fuel purged through said intake purging passage, when said engine is either idling or deceleration;
    an exhaust purging passage disposed to connect between said charcoal canister and said exhaust system for introducing evaporative fuel from said canister together with purging air into said exhaust system at a location upstream of said catalytic converter;
    load detecting means for detecting load on said engine; and
    second control means responsive to an output from said load detecting means for opening said exhaust purging passage when said load on said engine detected by said load detecting means is below a predetermined value which is set to a value within a range of values of load on said engine to be assumed when said engine is either idling or decelerating.

2. An evaporative emission control system according to claim 1, wherein said load detecting means detects opening of said throttle valve.

3. An evaporative emission control system according to claim 1, wherein said load detecting means detects at least one of pressure within said intake system and the rotational speed of said engine.

4. An evaporative emission control system for an internal combustion engine having an intake system, an exhaust system, a catalytic converter arranged across said exhaust system, and a fuel tank, said evaporative emission control system comprising:
    a charcoal canister connected to said fuel tank for collecting evaporative fuel generated from said fuel tank;
    an intake purging passage disposed to connect between said charcoal canister and said intake system for introducing evaporative fuel from said charcoal canister together with purging air to said intake system;
    an exhaust purging passage disposed to connect between said charcoal canister and said exhaust system for introducing evaporative fuel from said canister together with purging air into said exhaust system at a location upstream of said catalytic converter;
    load detecting means for detecting load on said engine;
    selector means for selectively opening and closing said intake purging passage and said exhaust purging passage; and
    control means responsive to an output from said load detecting means for controlling said selector means in a manner such that when said load on said engine detected by said load detecting means is below a predetermined value, said exhaust purging passage is opened, whereas when said load on said engine detected by said load detecting means is above said predetermined value, said intake purging passage is opened.

5. An evaporative emission control system according to claim 4, wherein said engine includes a throttle valve arranged in said intake system, and said load detecting means detects opening of said throttle valve.

6. An evaporative emission control system according to claim 4, wherein said load detecting means detects at least one of pressure within said intake system and the rotational speed of said engine.

7. An evaporative emission control system according to claim 4, wherein said predetermined value is an upper limit of a range of values of load on said engine to be assumed when said engine is either idling or decelerating.

8. An evaporative emission control system according to claim 4, wherein said exhaust purging passage branches off from a predetermined portion of said intake purging passage, said selector means comprising a valve arranged at said predetermined portion for selectively opening and closing said intake purging passage and said exhaust purging passage.

9. An evaporative emission control system according to claim 8, further including a second valve arranged across said exhaust purging passage for opening and closing said exhaust purging passage, said control means causing said valve of said selector means and said second valve to open said exhaust purging passage when said load on said engine detected by said load detecting means is below said predetermined value, and causing said valve of said selector means and said second valve to close said exhaust purging passage when said load on said engine is above said predetermined value.

10. An evaporative emission control system for an internal combustion engine having an intake system, an exhaust system, a catalytic converter arranged across said exhaust system, and a fuel tank, said evaporative emission control system comprising:
  a charcoal canister connected to said fuel tank for collecting evaporative fuel generated from said fuel tank;
  an exhaust purging passage disposed to connect between said charcoal canister and said exhaust system for introducing evaporative fuel from said canister together with purging air into said exhaust system at a location upstream of said catalytic converter;
  load detecting means for detecting load on said engine; and
  control means responsive to an output from said load detecting means for opening said exhaust purging passage only when said load on said engine detected by said load detecting means is below a predetermined value which is set to a value within a range of values of load on said engine to be assumed when said engine is either idling or decelerating.

* * * * *